United States Patent [19]
Schmit

[11] 3,715,740

[45] Feb. 6, 1973

[54] OPTICAL MASS MEMORY

[75] Inventor: Francis M. Schmit, St. Louis Park, Minn.

[73] Assignee: Honeywell Inc., Minneapolis, Minn.

[22] Filed: Aug. 30, 1971

[21] Appl. No.: 176,158

[52] U.S. Cl...................340/174.1 M, 179/100.2 CR, 346/74 MT, 350/151

[51] Int. Cl.............................G11b 5/02, H01v 3/04

[58] Field of Search...........179/100.2 CH, 100.2 CR; 340/174.1 M, 174 YC; 346/74 MT; 350/151

[56] References Cited

UNITED STATES PATENTS

| | | | |
|---|---|---|---|
| 3,164,816 | 1/1965 | Chang et al. | 346/74 MT |
| 3,368,209 | 2/1968 | McGlauchlin et al. | 346/74 MT |
| 3,631,415 | 12/1971 | Aagard | 340/174.1 M |
| 3,651,281 | 3/1972 | Becker | 179/100.2 CH |

*Primary Examiner*—J. Russell Goudeau
*Attorney*—Lamont B. Koontz et al.

[57] ABSTRACT

An optical mass memory of the Curie point writing type includes a separate read-out beam for checking written bits within fractions of microseconds after storage to ensure that the magnetization direction of the bit was properly stored.

4 Claims, 4 Drawing Figures

INVENTOR.
FRANCIS M. SCHMIT
BY Omund R. Dahle
ATTORNEY.

INVENTOR
FRANCIS M. SCHMIT

BY

Osmund R. Dahle
ATTORNEY

OPTICAL MASS MEMORY

BACKGROUND OF THE INVENTION

The present invention is directed to an optical mass memory and in particular to a memory in which information is stored on a ferromagnetic medium by Curie point writing.

A highly advantageous optical information storage scheme utilizes a laser to provide Curie point writing on a ferromagnetic medium. Such a scheme was disclosed and claimed in U.S. Pat. No. 3,368,209 to L. D. McGlauchlin et al. and is assigned to the same assignee as the present invention.

Ordinarily, optical mass memories utilizing Curie point writing make use of a thin ferromagnetic film such as manganese bismuth (MnBi) as a ferromagnetic medium. One difficulty which is encountered in utilizing thin magnetic films is that it becomes very difficult to prepare large areas of magnetic film which are completely free of flaws which are at least as large as the desired bit size. These flaws may be due, for example, to pinholes in the film or may be caused by small imperfections in the substrate upon which the magnetic film is deposited. If a bit is recorded in a region of the film containing a flaw, the bit may be erroneously recorded or not recorded at all and an erroneous output signal will be derived from that bit during read-out.

One successful method for overcoming this difficulty was described in a co-pending U.S. patent application entitled "Optical Mass Memory" by R. L. Aagard, which is assigned to the same assignee as the present invention. In this method the written bit is checked immediately after writing to ensure that the information in the form of a magnetization direction is properly stored. This self-checking is achieved by immediately monitoring the magneto-optic rotation caused by the bits as the bit cools to a temperature at which it has substantially recovered its magnetization.

In one preferred embodiment, the above-mentioned co-pending application described immediate monitoring of the magneto-optic rotation with the same light beam which is used for writing. When a moving ferromagnetic medium is used, it can be seen that instantaneous checking of the written bits with the same light beam used for writing is technically feasible only so long as the bit cools to a temperature at which it is substantially recovered its magnetization in a very short time compared to the dwell time of the light beam over the location of the bit. While this requirement is met in many applications, a high rate of motion of the ferromagnetic medium may place severe demands on the detector and modulator of such a system.

SUMMARY OF THE INVENTION

The system of the present invention makes it possible to check a written bit immediately after writing to ensure that the information in the form of a magnetization direction is properly stored. The system is capable of operation at high rates of motion of the ferromagnetic medium.

A first light source produces a first light beam which has an intensity sufficient to heat a region or "bit" of the ferromagnetic medium above the Curie temperature. A second light source produces a second light beam which is angularly separated from the first light beam in the direction of motion of the ferromagnetic medium. The second light beam has an intensity insufficient to heat the region of the ferromagnetic medium above the Curie temperature.

The first and second beams have a common pivot plane which is located between the first and second light sources and the ferromagnetic medium. Positioned at the common pivot plane is light beam positioning means, which positions the first and second light beams in a direction essentially orthogonal to the direction of motion of the ferromagnetic medium. Focusing means focuses the first and second light beams to a first and a second focused light spot, respectively, on the ferromagnetic medium. The first and second focused light spots are spatially separated from one another in the direction of motion of the ferromagnetic medium.

Modulator means is positioned in the path of the first light beam to selectively allow the first light beam to attain an intensity sufficient to heat the region to a temperature above the Curie temperature, and then attenuate the first light beam to an intensity insufficient to heat the region above the Curie temperature, such that the region cools to a temperature below the Curie temperature and has a magnetization direction determined by the net magnetic field present at the location of the region. Detector means is positioned to receive the second light beam from the ferromagnetic medium. Detector means produces a magneto-optic signal which is indicative of the magnetization direction of the region.

DESCRIPTION OF THE PREFERRED EMBODIMENTS

Figures 1, 4:
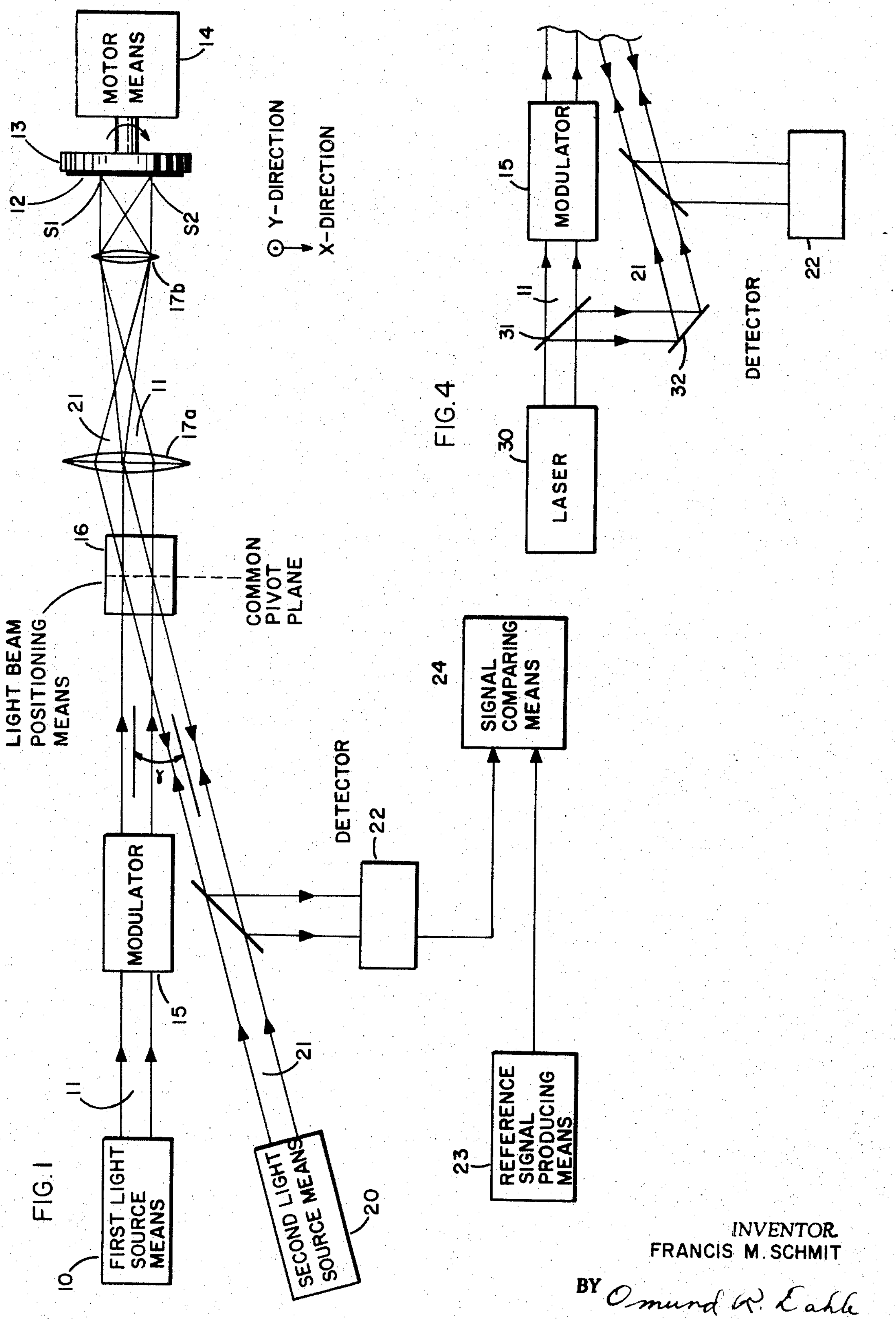
FIG. 1 diagrammatically shows an optical mass memory of the Curie point type including a system for immmediately checking written bits.
FIG. 4 diagrammatically shows another embodiment of an optical mass memory of the present invention.

In FIG. 1 is schematically shown an optical mass memory utilizing Curie point writing. First light source means 10 provides a first light beam 11 having an intensity sufficient to heat a region of ferromagnetic medium 12 to a temperature above the Curie temperature. In a preferred embodiment ferromagnetic medium is a manganese bismuth film. As shown in FIG. 1, ferromagnetic medium 12 is positioned on disk 13 which is rotated by motor means 14. Alternatively, ferromagnetic medium 12 may be deposited on a drum which is rotated by motor means 14. Modulator 15 is positioned in the path of first light beam 11 between first light source means 10 and ferromagnetic medium 12. Modulator 15 may, for example, comprise an electro-optic, acousto-optic, or magneto-optic light beam modulator. Light beam positioning means 16 which may comprise, for example, electro-optic, acousto-optic, or mechanical light beam deflectors, positions first light beam 11 in a direction essentially orthogonal to the direction of motion of ferromagnetic medium 12. For reference purposes, the direction of motion of the ferromagnetic medium 12 is hereafter referred to as the X direction, and the direction in which the first light beam 11 is positioned by a light beam positioning means 16 is hereafter referred to as the Y direction. Focusing means, which is shown in FIG. 1 as comprising first and second lenses 17*a* and 17*b*, focuses first light beam 11 to a first focused light spot S1 on ferromagnetic medium 12. It should be noted that the focusing means may comprise a single lens, or two or more lenses.

Modulator 15 is designed to modulate first light beam 11. At a first extreme, modulator 15 allows the maximum intensity of light beam 11 to be transmitted to ferromagnetic medium 12. The maximum beam intensity is sufficient to heat the region to a temperature above the Curie temperature. At a second extreme, modulator 15 attenuates first light beam 11 to its minimum value and the beam intensity reaching the region of ferromagnetic medium 12 is not sufficient to raise its temperature to the Curie temperature. Therefore, Curie point writing is achieved when modulator 15 selectively allows first light beam 11 to attain an intensity sufficient to heat a region to a temperature above the Curie temperature. Modulator 15 then attenuates first light beam 11 to an intensity insufficient to heat the region above the Curie temperature, such that the region cools to a temperature below the Curie temperature. The magnetization direction of the region upon cooling is determined by the net magnetic field present at the location of the region. The net magnetic field may be due solely to the magnetic field of the ferromagnetic material surrounding the region, or may be due to the magnetic field as the surrounding regions plus an external magnetic field applied by a coil (not shown). In addition, when modulator 15 remains at the second extreme it allows the magnetization direction of the region to remain unchanged.

In the present invention, the magnetization direction of the region written is checked within fractions of microseconds after writing to ensure that the desired magnetization direction was properly stored in the region. This is achieved by monitoring the magneto-optic rotation caused by the region as the region cools to a temperature at which it has substantially recovered its magnetization. Second light source means 20 produces a second light beam 21 which is angularly separated from first light beam 11 in the X direction. First and second light beams 11 and 21 have a common pivot plane which is located between first and second light source means 10 and 20 and ferromagnetic medium 12. Light beam positioning means 16 is positioned at the common pivot plane such that both first and second light beams 11 and 21 are equally deflected in the Y direction. As with first light beam 11, second light beam 21 is focused by focusing means 17 to a second focused light spot S2. First and second focused light spots S1 and S2 are spatially separated from one another in the X direction such that a region of ferromagnetic medium 12 passes first through S1 and then through S2.

Detector means 22 monitors the magneto-optic rotation caused by a region as it cools immediately after writing and produces a magneto-optic signal which is indicative of the magnetization direction stored in the region. As shown in FIG. 1, the Kerr magneto-optic effect is monitored by detector means 22. However, it is to be understood that the Faraday magneto-optic effect, which utilizes light transmitted by ferromagnetic medium 12 rather than light which has been reflected, may be used as well. Reference signal producing means 23 produces a reference signal which represents the magnetization direction which is desired to be stored in the region. The magneto-optic signal produced by detector means 22 and the reference signal are compared by signal comparing means 24, thereby determining whether the magnetization direction of the region was properly stored.

It can be seen that the present invention is technically feasible only so long as the region cools to a temperature at which it substantially recovered its magnetization by the time the region reaches second focused light spot S2. The required spacing between focused light spots S1 and S2 depends upon the rate of motion of ferromagnetic medium 12. The present invention allows this spacing to be adjusted by varying the angle between first light beam 11 and second light beam 21.

To further demonstrate the operation of the present invention, a system utilizing manganese bismuth film as the ferromagnetic medium will be discussed. However, it is to be understood that the present invention is not restricted to this particular ferromagnetic medium.

Figure 2:
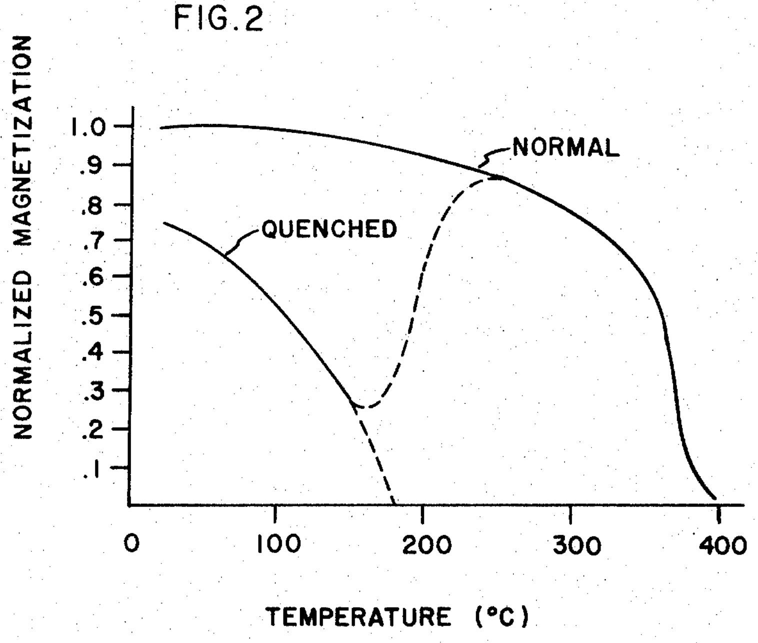
FIG. 2 shows the magnetization of manganese bismuth film as a function of temperature for both the normal and the quenched phases of manganese bismuth.

FIG. 2 shows the normalized magnetization of the normal and quenched crystallographic phases of manganese bismuth film. It can be seen that a temperature of 100°C the magnetization of the normal phase film is 98 percent of its room temperature value. Similarly, the magnetization of the quenched phase film is 75 percent of its room temperature value. Therefore, whether the region is in the normal phase or the quenched phase, the magnetization of the region is substantially recovered by the time the region cools to a temperature of 100°C.

Figure 3:
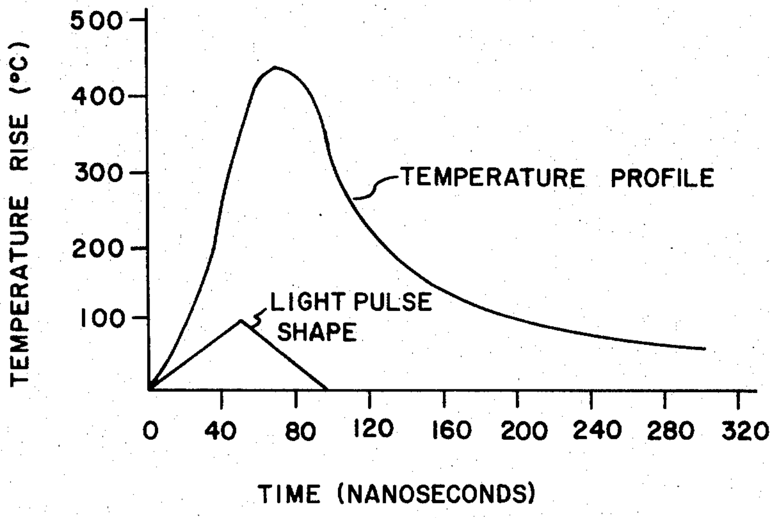
FIG. 3 shows temperature as a function of time for the center of a one micron diameter region of manganese bismuth film subjected to a 100 nanosecond laser pulse.

FIG. 3 shows the temperature versus time profile for the center of a 1 micron diameter spot on a backed MnBi film. The term "backed" indicates that the MnBi film was deposited on a substrate such as glass or mica. A substrate of higher thermal conductivity would cause the film to cool even faster. The temperature is taken at the center of the spot which was heated by a laser pulse with a triangular temporal shape and a pulse length of 100 nanoseconds. The laser beam has a Gaussian spatial profile with a $1/e$ radius of 0.872 microns. This results in a micron diameter isotherm at 360°C (the Curie temperature of the normal phase MnBi film) when the peak temperature is at 440°C. As shown in FIG. 3, at 200 nanoseconds after the beginning of the laser pulse, the temperature at the center of the spot is down to 100°C. Therefore, by this time, the magnetization has recovered to 98 percent of the room temperature value when the region is in the normal phase and 75 percent of the room temperature value when it is in the quenched phase.

The spacing between S1 and S2 is dependent upon the rate of motion of the moving medium. For example, a moving medium generating $10^6$ bit per second serial data rate from 1 micron bits spaced 5 microns center to center must have a linear velocity of 5 microns per microsecond. From FIG. 3 it can be seen that the center of the region is actually written 70 nanoseconds after the beginning of the laser heat pulse. Assuming a linear velocity of 5 microns per microsecond, the center region is therefore written 0.35 microns from the beginning of the pulse. Therefore, when the spacing between S1 and S2 is greater than 1 micron the region heated will have substantially recovered its magnetization by the time that region reaches S2. At higher data rates, a larger spacing between S1 and S2 becomes necessary.

FIG. 4 shows another embodiment of the present invention which is similar to that shown in FIG. 1 and similar numerals are used to designate similar elements. As shown in FIG. 4, first and second light source means 10 and 20 of FIG. 1 have been replaced by a single light source, shown as laser 30. Beam splitter 31 splits off a portion of first light beam 11 to form second light beam 21. Mirror 32 directs second light beam 21 toward ferromagnetic medium 12 such that first and second light beams 11 and 21 have a common pivot plane similar to that shown in FIG. 1.

While this invention has been particularly shown and described with reference to the preferred embodiments thereof, it will be understood by those skilled in the art that changes in form and detail may be made therein without departing from the scope and spirit of the invention.

The embodiments of the invention in which an exclusive property or right is claimed are defined as follows:

1. An optical mass memory comprising:

a ferromagnetic medium, motor means for providing motion of the ferromagnetic medium in a first direction, first light source means for producing a first light beam having an intensity sufficient to heat a region of the ferromagnetic medium to a temperature above the Curie temperature, second light source means for producing a second light beam angularly separated from the first light beam in the first direction and having an intensity insufficient to heat the region of the ferromagnetic medium to a temperature above the Curie temperature, the first and second light beams having a common pivot plane located between the first and second light source means and the ferromagnetic medium, light beam positioning means positioned at the common pivot plane for positioning the first and second light beams in a second direction essentially orthogonal to the first direction, focusing means for focusing the first and second light beams to a first and a second focused light spot respectively on the ferromagnetic medium, the second focused light spot being spatially separated in the first direction from the first light spot, modulator means for selectively transmitting the first light beam with an intensity sufficient to heat a region of the ferromagnetic medium to a temperature above the Curie temperature, and then attenuating the first light beam to an intensity insufficient to heat the region to a temperature above the Curie temperature, such that the region cools to a temperature below the Curie temperature and has a magnetization direction determined by a net magnetic field present at the location of the region, and detector means for receiving the second light beam from the region and for producing a magneto-optic signal indicative of the magnetization direction of the region.

2. The optical mass memory of claim 1 and further comprising:

reference signal producing means for producing a reference signal representing the magnetization direction desired to be stored in the region, and signal comparing means for comparing the reference signal and the magneto-optic signal to determine whether the magnetization direction of the region was properly stored.

3. The optical mass memory of claim 1 wherein the ferromagnetic medium is manganese bismuth film.

4. The optical mass memory of claim 1 wherein the second light source means comprises:

beam splitter means positioned in the path of the first beam to split off a portion of the first beam, thereby forming the second light beam, and mirror means for directing the second light beam toward the ferromagnetic medium.

* * * * *